United States Patent [19]

Cook

[11] Patent Number: 5,018,875
[45] Date of Patent: May 28, 1991

[54] DIGITAL THERMOMETER WITH PIVOTABLE PROBE

[75] Inventor: Tunis A. Cook, Perkasie, Pa.

[73] Assignee: PSG Industries, Inc., Perkasie, Pa.

[21] Appl. No.: 525,366

[22] Filed: May 17, 1990

[51] Int. Cl.$^5$ .............................................. G01K 7/04
[52] U.S. Cl. ...................................... 374/208; 374/163
[58] Field of Search ........................... 374/208; 73/431

[56] References Cited

U.S. PATENT DOCUMENTS

| | | |
|---|---|---|
| D. 168,105 | 11/1952 | Mitchell et al. . |
| D. 182,088 | 2/1958 | Stiens . |
| D. 187,816 | 5/1960 | Woofter . |
| D. 236,254 | 8/1975 | Ray . |
| D. 247,099 | 1/1978 | Schwartz . |
| D. 297,819 | 9/1988 | Cacciatore . |
| 2,790,617 | 4/1957 | Harland ........................ 374/208 X |
| 2,947,171 | 8/1960 | Peltola ........................... 374/185 X |
| 3,690,176 | 9/1972 | Connolly et al. ............. 374/185 X |
| 4,441,827 | 4/1984 | Coderre ........................ 374/163 X |
| 4,536,851 | 8/1985 | Germanton et al. . |
| 4,783,352 | 11/1988 | Kaiser . |

FOREIGN PATENT DOCUMENTS 3346273 7/1984 Fed. Rep. of Germany .

Primary Examiner—Daniel M. Yasich
Attorney, Agent, or Firm—Panitch Schwarze Jacobs & Nadel

[57] ABSTRACT

A digital thermometer having a probe with a sensing and casing end. The casing end includes a generally transversely extending pivot boss having a first and second end. A sensor is positioned within the sensing end of the probe for sensing the temperature proximate the sensing end and for generating an electrical signal proportionate to the sensed temperature. A casing supports the casing end of the probe and includes supports for receiving the first and second ends of the pivot boss such that the pivot boss can pivot with respect to the casing. Circuitry is positioned within the casing and is electrically connected to the sensor for receiving the electrical signal and converting the electrical signal to a digital temperature signal. A display on the casing receives the digital temperature signal and displays the sensed temperature such that the casing can pivot with respect to the probe for allowing the digital display to be viewed from a plurality of perspectives.

3 Claims, 2 Drawing Sheets

DIGITAL THERMOMETER WITH PIVOTABLE PROBE

FIELD OF THE INVENTION

The present invention relates generally to thermometers and, more particularly, to thermometers having a temperature sensing probe pivotally mounted with respect to a casing having a digital display, thereby allowing the display to be rotated to a conveniently readable position with respect to an observer once the probe has been placed in the desired position.

BACKGROUND OF THE INVENTION

In the thermometer field it is often a problem for technical personnel to read the temperature display because the display is rigidly attached to the sensor. Personnel having the responsibility for monitoring the temperature of, for example, food products during storage and during periods of display at the point of sale have need for a means of observing such temperatures with convenience and accuracy. Articles whose temperatures are to be monitored are frequently in positions such that output screens or scales rigidly attached to their associated temperature sensing probes are not readily readable. Similar problems arise when the temperatures to be measured are associated with air leaving outlet grilles or louvers; with human orifices within which temperatures are commonly measured for medical diagnostic purposes; or with insert wells in reactor or other types of pressure vessels whose temperatures must be monitored for control of process progress, efficiency or safety.

Solutions to these problems have included instruments that hold their highest or last reading. An example of an instrument utilizing this solution is a mercury-in-glass fever thermometer having a restriction in the passage between the sensing bulb and the scale. When a thermometer of this type, having registered a patient's temperature, is removed from the patient and exposed to a cooler environment, the restriction prevents the retreat of the mercury column and allows the physician to read the patient's body temperature without significant error. Electrical instruments having rigidly connected sensors and scales, such as tong type clamp-on ammeters have, similar problems and have utilized a similar solution. The solution is comprised of a mechanical lock by which the operator can lock the unseen meter needle, causing the needle to hold its position while the instrument is removed and the needle position is observed and recorded.

These solutions, though reasonably effective for their limited purposes, are less desirable or even ineffective and harmful when "on line" observation of rapidly changing temperatures is required. Examples of such rapidly changing temperatures are those which occur in refrigerated food storage cases during evaporator defrost cycles or during compressor operating cycles; those which occur in the air outlet ducts of heating and air conditioning systems as the heating or conditioning equipment cycles on/off or changes capacity; or those which occur in chemical or other processes.

Traditional thermometers, in addition to being extremely fragile are noted for their propensity for rolling off tables where they are casually laid and fall to their destruction. The trapezoidal non-rollable case design of the instrument of the present invention helps prevent such accidental destruction from occurring.

The present invention resulted from the inventor's observation of these problems and his successful efforts to solve them. The present invention, therefore, is directed toward a self-contained portable thermometer having a digital display and a temperature sensing probe which is pivotally connected to the portion of the thermometer containing the display thereby allowing the display to be rotated to a conveniently readable position with respect to an observer once the probe has been placed in the desired position.

SUMMARY OF THE INVENTION

Briefly stated, the present invention is a digital temperature indicating apparatus. The apparatus comprises a probe having a sensing and a casing end. The casing end includes a pivot boss extending generally transversely with respect to said probe, said pivot boss having a first end and a second end. The first and second ends are generally aligned along a common axis. A sensor means is positioned within the probe proximate the sensing end for sensing the temperature proximate the sensing end of the probe and for generating an electrical signal proportionate to the sensed temperature. A casing means is provided having a display end and a probe end for supporting the casing end of the probe. The casing means includes support means positioned on the probe end for receiving the first and second ends of the pivot boss, such that the pivot boss and probe can pivot with respect to the casing means. An electronic means is positioned within the casing means and is electrically connected to the sensor means for receiving the electrical signal and converting the electrical signal to a digital temperature signal. A digital display means is positioned on the casing means for receiving the digital temperature signal and displaying the sensed temperature, whereby the casing means can pivot with respect to the probe for allowing the digital display means to be viewed from a plurality of perspectives.

BRIEF DESCRIPTION OF THE DRAWING

The foregoing summary, as well as the following detailed description, will be better understood when read in conjunction with the appended drawing. For the purpose of illustrating the invention there are shown embodiments which are presently preferred, it being understood, however, that this invention is not limited to the precise arrangement and instrumentalities shown. In the drawing.

DESCRIPTION OF THE PREFERRED EMBODIMENT

Figure 1:
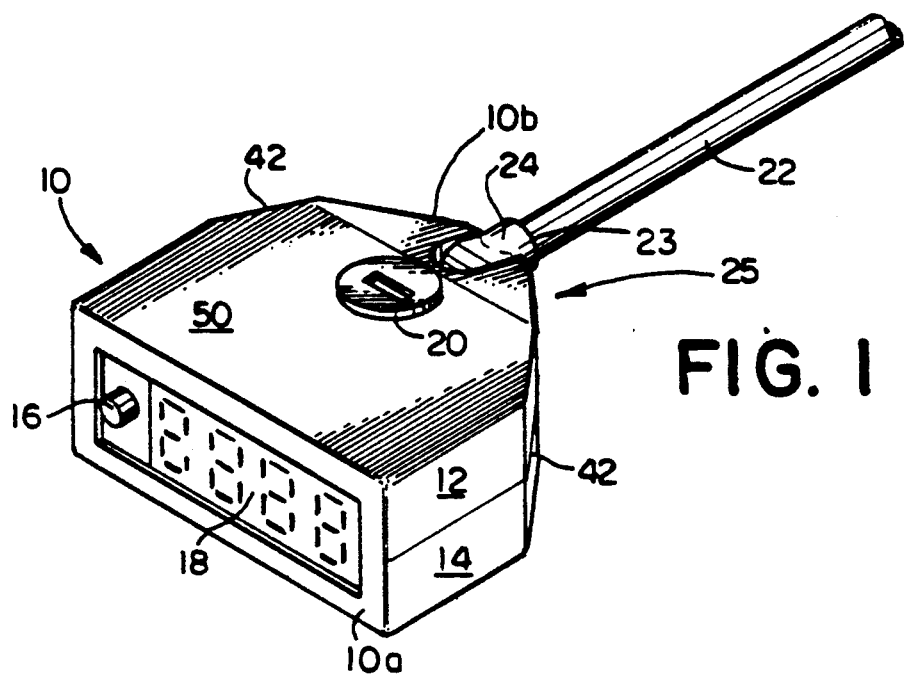
FIG. 1 is a partial perspective view of a digital thermometer in accordance with the present invention.

Certain terminology is used in the following description for convenience only and is not limiting. The words "right," "left," "lower" and "upper" designate directions in the drawing to which reference is made. The words "inwardly" and "outwardly" refer to directions toward and away from, respectively, the geometric center of the digital thermometer and designated parts thereof. The terminology includes the words above specifically mentioned, derivatives thereof and words of similar import.

Figure 3:
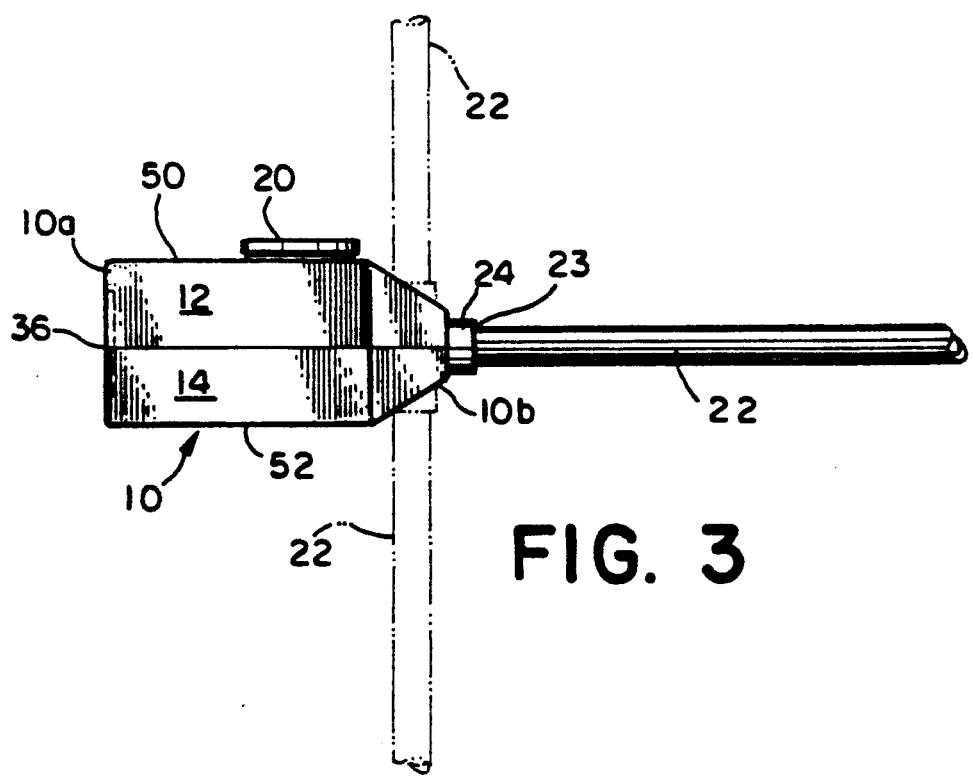
FIG. 3 is an elevational view of the digital thermometer of FIG. 1 illustrating a probe in three different positions.
Figure 2:
FIG. 2 is a plan view of the digital thermometer of FIG. 1.
Figure 2:
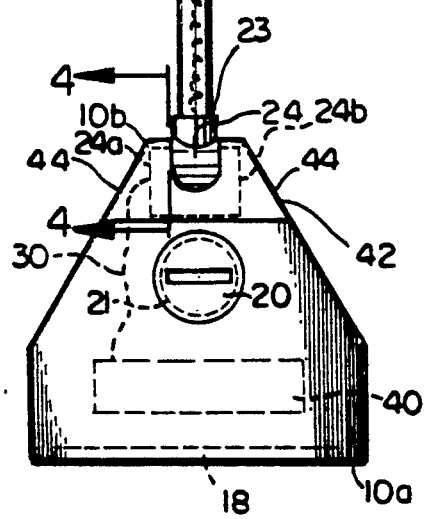

Referring now to the drawing in detail, wherein like numerals indicate like elements throughout, there is shown in FIGS. 1, 2 and 3 a preferred embodiment of a digital temperature indicating apparatus in accordance with the present invention.

There is shown in FIG. 2, a probe 22 which is preferably formed of a hollow generally cylindrical tube having a sensing or closed end 46 and an open or casing end, generally designated 23. In the presently preferred embodiment, the probe 22 is formed of type 304 stainless steel and is generally 0.166 inches (4.0 mm) in diameter and has a length of approximately 5 inches (120 mm). However, it is understood by those skilled in the art, that other materials are suitable for the probe 22, such as aluminum or titanium. Moreover, it is similarly understood that the shape and dimensions of the probe can be varied, if desired, to suit particular applications.

Figure 5:
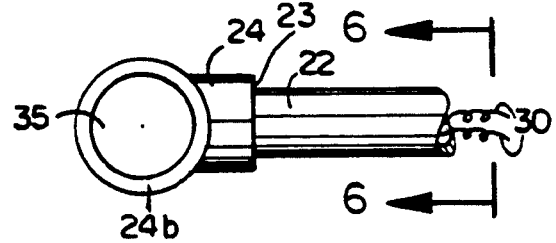
FIG. 5 is a partial elevational view, partially broken away, of the probe shown in FIG. 2.
Figure 6:
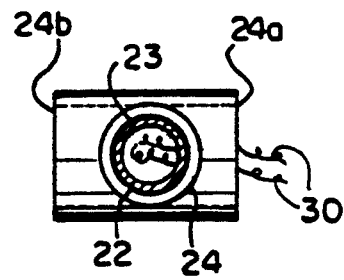
FIG. 6 is an elevational view of the probe shown in FIG. 5 taken along lines 6—6 of FIG. 5.

Referring now to FIGS. 2, 5 and 6, the casing end 23 of the probe 22 terminates in a sleeve-like member, referred to hereinafter as pivot boss 24. The pivot boss 24 extends generally transversely with respect to the probe 22 and includes a first end 24a and a second end 24b. The first and second ends 24a and 24b are generally aligned along a common longitudinal axis. As shown in FIGS. 2 and 5, the pivot boss is preferably generally cylindrically shaped. A generally circular channel 35 extends completely through the pivot boss 24 between the first and second ends 24a and 24b.

As best shown in FIG. 6, the pivot boss 24 is preferably of singular construction. However, it is understood by those skilled in the art, that the pivot boss 24 could be constructed of two generally identical half sections fastened together at a cleavage line. The pivot boss 24 includes a probe recess 37 for receiving the casing end 23 of the probe 22.

In the present embodiment, the pivot boss 24 is preferably molded or otherwise formed from a thermoplastic polymer, such as ABS (acrylonitrile-butadiene-styrene). However, it is understood by those skilled in the art, that the pivot boss 24 can be constructed of other materials or thermosetting polymers, such as polystyrene, polycarbonate, phenol formaldehyde, urea-formaldehyde or polyester and metals, such as cast zinc or aluminum.

As mentioned previously, the pivot boss 24 is traversed by the channel 35 which is accessible from the first and second ends of the pivot boss 24. The channel 35 communicates with the interior of the probe 22 to thereby form a conduit through which a set of interconnecting wires 30 are routed from a sensor to provide electrical communication between the sensor and the electric elements supported within the digital thermometer, as discussed in more detail below.

Referring now to FIG. 2, in the presently preferred embodiment, sensor means is positioned within the probe 22 proximate the sensing end 46 for sensing the temperature proximate the sensing end 46 of the probe 22 and for generating an electrical signal proportionate to the sensed temperature. It is preferred that the sensing means be comprised of a temperature sensing transducer 48 whose electrical characteristics change with temperature in a highly reproducible way. The transducer 48 in the present embodiment is preferably a thermistor and the changeable electrical characteristic is its resistance. It is within the ambit of those skilled in the art, to use other temperature sensing transducers, such as thermocouples or platinum wire wound on a planar or cylindrical substrate. Connected to the transducer 48 are the interconnecting wires 30 which extend through the interior of the probe 22 to convey its electrical characteristics to an electronic assembly 40, described in more detail below.

Referring now to FIGS. 1 and 2, there is shown a generally trapezoidally shaped casing means or casing 10 having a display end 10a and a probe end 10b for supporting the casing end 23 of the probe 22. Preferably, the casing 10 has upper and lower generally parallel surfaces 50 and 52. The probe end 10b includes tapered sides 42 for forming the generally trapezoidal shape. The generally trapezoidal shape of the casing 10 ensures positional stability positively providing against unintended rolling of the instrument to destruction from an intended place of rest.

The casing 10 is preferably formed of an upper portion 12 and a lower portion 14. The two portions 12 and 14 meet at the seam 36 and are snapped together by cooperating elements (not shown) within the casing 10. However, it is understood by those skilled in the art, that other means of fastening the upper and lower portions 12, 14 can be used, such as clips or adhesives. The internal structure of the casing 10, while not shown, is generally comprised of webs, ribs, cavities, fillets and openings as required to provide the necessary rigidity and support for the various internal and external components described below.

As shown in FIG. 2, the casing 10 includes support means positioned on the probe end 10b. The support means is preferably adapted to receive the first and second ends 24a and 24b of the pivot boss 24, such that the probe 22 can pivot with respect to the casing 10. In the present embodiment, it is preferred that the support means be comprised of two spaced apart support members 44 projecting outwardly from the probe end 10b of the casing 10. Each support member 44 preferably includes a pivot hole 33 positioned therein and generally aligned with the common axis of the first and second ends 24a and 24b. As shown in FIG. 2, the pivot boss 24 is positioned between the two support members 44 such that the first and second ends 24a and 24b are rotatably positioned within the pivot holes 33 of the support members 44, respectively, for allowing the pivot boss 24 to rotate with respect to the pivot holes 33 and casing 10.

In the present embodiment, it is preferred that the casing 10 be molded or otherwise formed of generally the same materials described as suitable for fabrication of the pivot boss 24.

Figure 4:
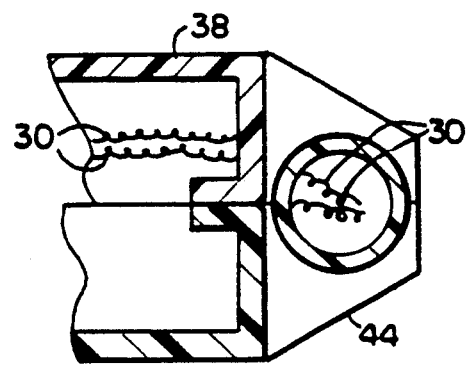
FIG. 4 is a cross-sectional view of the digital thermometer shown in FIG. 2 taken along lines 4—4 of FIG. 2.

Referring now to FIGS. 4, 5 and 6, the digital temperature indicating apparatus includes drag means for resisting the pivotable motion of the probe 22. Preferably, the drag means comprises an area of frictional contact between the pivot boss 24 and the support members 44 of the casing 10. Specifically, the drag means comprises an area of frictional contact between the first and second ends 24a, 24b of the pivot boss 24 and the pivot holes 33. However, it is understood by those skilled in the art, that other drag means could be utilized, such as cooperating grooves (not shown) on the pivot boss 24 and casing 10.

Referring now to FIG. 1, a digital display means 18 is positioned on the display end 10a of the casing 10 for receiving a digital temperature signal (described hereinafter) and for displaying the sensed temperature of the transducer 48. In the present embodiment, it is preferred that the digital display means 18 be a liquid crystal type (LCD) which is typically well suited for use in self-contained and self-powered instruments, used in moderate to well lit environments, because of its extremely low power demands. However, it is understood by those skilled in the art, that where the instrument is used in poorly lit environments, internally lighted displays, such as those based on light emitting diodes (LED), gas discharge or vacuum fluorescent digital elements, may be preferred despite the greater power demands.

Positioned within the casing 10, is an electrical power source. Preferably, the electrical power source is comprised of a battery 21 positioned within a battery compartment (not shown) which includes a cover 20 for providing access to the battery compartment for battery installation or replacement. The cover 20 is held securely in place on the upper surface 50 of the body casing 10 by interrupted threads (not shown) which allow its installation and removal with one-quarter turn of the cover 20.

In the present embodiment, it is preferred that a button type battery having a single cell with 1.5 V output, such as Everready's No. E675 which corresponds to IEC No. R07, be positioned with the battery compartment for powering the digital thermometer. However, it is understood by those skilled in the art, that displays requiring substantially more power (e.g., an LED display) would employ larger power supplies or batteries. It is further understood by those skilled in the art, that other electrical power sources could be used, such as a photovoltaic cell positioned in place of the cover 20.

Within the casing 10, is positioned electronic means which is electrically connected to the transducer 48, the electrical power source or battery 21 and the digital display means 18 for receiving the electrical signal of the transducer 48 and converting the electrical signal to a digital temperature signal. In the present embodiment, it is preferred that the electronic means be comprised of an integrated circuit 40. The integrated circuit 40 is connected to the transducer 48 by the interconnecting wires 30 and converts the characteristic resistance of the transducer 48 to an output which is conveyed, by means not shown, to the digital display means 18 whereon the temperature of the transducer 48 is displayed. Electronic means for performing this function is well known to those skilled in the art of electronic temperature measurement and display, and, therefore, further description thereof is not believed to be necessary or limiting. Such electronic means is disclosed in U.S. Pat. No. 4,536,851 which is hereby incorporated by reference.

Referring now to FIG. 1, a switch means provides an update or instantaneous display of the temperature of the probe 22. Preferably, the switch means is comprised of a push button 16 positioned adjacent the digital display means 18 for actuating an internal switch (not shown) to instantaneously update the digital temperature indicating apparatus, as is understood by those skilled in the art. However, it is understood by those skilled in the art, that the switch means could perform other functions, such as activating the apparatus or converting the display 18 between fahrenheit and celsius scales.

In use, the pivot boss 24 is clamped between the upper and lower portions 12, 14 at the probe end 10b of the casing 10. That is, the pivot boss 24 is positioned between the support members 44 with the first and second ends 24a, 24b extending into the pivot holes 33 formed in each of the support members 44, as best shown in FIGS. 2 and 6. Thus, the casing 10 can pivot with respect to the probe 22 for allowing the digital display 18 to be viewed from a plurality of perspectives.

More particularly, the friction between the contacting surfaces of the first and second ends 24a, 24b and the pivot holes 33 provides the drag necessary to maintain the position of the casing 10 with respect to the probe 22, thereby allowing manual adjustment of the radial position of the hollow probe 22 with respect to the digital display means 18. Thus, mechanical stability of the relative positions of the probe 22 and the casing 10 is provided.

From the foregoing description, it can be seen that the present invention comprises an improved case and probe assembly for a digital thermometer. It will be appreciated by those skilled in the art, that changes could be made to the embodiment described in the foregoing description without departing from the broad inventive concept thereof. It is understood, therefore, that this invention is not limited to the particular embodiment disclosed, but is intended to cover all modifications which are within the scope and spirit of the invention as defined by the appended claims.

I claim:

1. A digital temperature indicating apparatus comprising:

a probe having a sensing end and a casing end, the casing end including a pivot boss extending generally transversely with respect to said probe, said pivot boss having a first end and a second end, the first and second ends being generally aligned along a common axis;

sensor means within the probe proximate the sensing end for sensing the temperature proximate the sensing end of the probe and generating an electrical signal proportionate to the sensed temperature;

casing means have a display end and a probe end for supporting the casing end of the probe, said casing means including support means positioned on the probe end for receiving the first and second ends of the pivot boss, such that the pivot boss and probe can pivot with respect to the casing means;

electronic means within said casing means and electrically connected to the sensor means for receiving the electrical signal and converting the electrical signal to a digital temperature signal; and digital display means on the casing means for receiving the digital temperature signal and displaying the sensed temperature, whereby the casing means can pivot with respect to the probe for allowing the digital display means to be viewed from a plurality of perspectives.

2. The digital temperature indicating apparatus as recited in claim 1, wherein said support means comprises two spaced apart support members projecting from the probe end of the casing means, each support member including a pivot hole positioned therein and generally aligned with the common axis, the pivot boss being positioned between the two support members, such that the first and second pivot boss ends extend into the pivot holes of the support members for allowing the pivot boss to pivot with respect to said pivot holes.

3. The digital temperature indicating apparatus as recited in claim 2, wherein said pivot boss is generally cylindrically shaped.

* * * * *